(12) United States Patent
Gillespie (10) Patent No.: US 9,757,693 B1
(45) Date of Patent: Sep. 12, 2017

(54) DIALYSIS WATER PURIFICATION SYSTEM

(76) Inventor: Kevin C. Gillespie, Louisville, KY (US)

( * ) Notice: Subject to any disclaimer, the term of this patent is extended or adjusted under 35 U.S.C. 154(b) by 565 days.

(21) Appl. No.: 12/945,471

(22) Filed: Nov. 12, 2010

Related U.S. Application Data (60) Provisional application No. 61/261,119, filed on Nov. 13, 2009.

(51) Int. Cl.
    *B01D 29/88* (2006.01)
    *B01D 24/46* (2006.01)
    *B01D 29/62* (2006.01)
    *B01D 61/12* (2006.01)

(52) U.S. Cl.
    CPC ......... B01D 61/12 (2013.01); *B01D 2321/04* (2013.01); *C02F 2209/04* (2013.01); *C02F 2209/06* (2013.01); *C02F 2209/40* (2013.01)

(58) Field of Classification Search
    CPC ............. C02F 2209/06; C02F 2209/04; C02F 2209/40; B01D 2311/04; B01D 2321/04; B01D 2321/40
    USPC ....... 210/662, 663, 670, 673, 678, 739, 742, 210/743, 753, 806, 87, 88, 89, 103, 108, 210/134, 136, 167.3, 167.31, 199, 202, 210/203, 258, 295, 333.1, 4, 11, 416.1, 210/418, 425
    See application file for complete search history.

(56) References Cited

U.S. PATENT DOCUMENTS

| | | | |
|---|---|---|---|
| 5,348,664 A * | 9/1994 | Kim et al. ................... | 210/746 |
| 6,398,965 B1 * | 6/2002 | Arba et al. ................... | 210/652 |
| 6,657,546 B2 * | 12/2003 | Navarro et al. .............. | 340/653 |
| 6,977,047 B2 * | 12/2005 | Nunez ........................... | 210/664 |
| 2005/0167345 A1 * | 8/2005 | De Wet et al. ................. | 210/85 |

OTHER PUBLICATIONS

Isopure; CF Series Digital Monitor and Controller Operator's Manual;LA99930 Rev. E.

* cited by examiner

*Primary Examiner* — Claire Norris
(74) *Attorney, Agent, or Firm* — Middleton Reutlinger (57) ABSTRACT

The invention comprises a control system for monitoring and operating an existing supply water pre-treatment system for supplying de-chlorinated water to dialysis purification systems. The invention includes a controller and an operator interface for programming and interacting with said control systems. The invention further includes an injection assembly having a flow turbine sensor, a reducing agent injector, and an ORP/pH sensor for monitoring and controlling ORP/pH levels of said supply water.

10 Claims, 4 Drawing Sheets

DIALYSIS WATER PURIFICATION SYSTEM

CROSS-REFERENCE TO RELATED APPLICATIONS

The present application claims the benefit of U.S. Provisional Patent Application Ser. No. 61/261,119, filed Nov. 13, 2009, and entitled "Dialysis Water Purification System".

BACKGROUND OF THE INVENTION

Field of the Invention

The present invention relates generally to a water purification system and more specifically to a system and method for monitoring and cleaning a water pre-treatment system including backwash and regeneration of all media tanks used to provide water to a primary purification system.

Description of the Related Art

Dialysis systems for treatment of patients with kidney disorders are in widespread use throughout the health care industry. These systems all require a constant source of purified water that removes organic and inorganic substances and microbial contaminants from the water to be supplied to a plurality of hemodialysis stations at which patients are treated. Most dialysis water systems employ a plurality of pre-treatment components for removing these contaminants. For example, a plurality of filtration tanks such as multi-media filters, granular activated carbon filters (GAC's), granular activated carbon polishers, and water softeners are arranged in series to supply dechlorinated water to a primary purification system for dialysis use.

These prior art systems require frequent, periodic cleaning to ensure that contaminants filtered through the process do not build up in the filtration tanks over time. Typically, these tanks must be backwashed, whereby clean water is forced in a reverse flow direction through the media tanks and then out into a drain system to remove contaminants that build up in the filtration media. The backwashing process is, in many cases, accomplished manually through operation or actuation of control valves that reverse fluid flow through the filtration tanks. In some prior art systems, the backwash process for each individual filtration tank is accomplished by utilizing a timer-actuated control valve that provides for the flow of water in a supply or filtration direction during a "normal" operating mode, and switches the water flow to a "backwash" mode or cycle of operation at a set time period during each day or week depending upon the timer settings for that control valve.

However, these timer-activated systems suffer from a great number of disadvantages. Initially, unless an operator is actually present at the time the backwash mode of operation is occurring, there is no way to know that the appropriate backwash operation occurred. Additionally, since most dialysis water systems employ multiple filtration tanks such as multi-media filters, granular activated carbon filters, and water softeners, these tanks must be backwashed individually rather than simultaneously since the flow of water required for a backwash or rinse cycle is quite high, and most water supply systems can't accommodate multiple tanks backwashing simultaneously since a reduced water flow rate would not provide sufficient backwash or rinse flow. System cleaning typically occurs late at night when the dialysis stations are not in use. When timer-actuated backwash operation is used, if an operator times more than one filtration tank to backwash in the same time period, the water flow rates to each tank may be insufficient to provide proper contaminant reductions.

Further compounding this problem is that when backwash operations occur late at night, an operator may not be present to determine that an incorrect backwash operation has occurred, i.e., that two or more tanks have backwashed simultaneously. In this situation dialysis water system operation may be suboptimal or indeed hazardous to patients since the filtration tanks are not sufficiently cleaned to remove contaminants from the water.

Additionally, in many prior art dialysis systems the contaminant level in the water must be monitored by taking frequent samples and testing them manually to verify that the water is sufficiently devoid of contaminants to be used as supply water for dialysis systems.

SUMMARY OF THE INVENTION

The present invention overcomes the disadvantages of the prior art by providing a control system for a pre-treatment system used to supply purified water to dialysis equipment having a plurality of sensors for interacting with the pre-treatment system and preventing improper operation thereof, thus assuring patient safety and health.

The invention includes a controller and operator interface for monitoring the pre-treatment system, which typically includes a number of filtration tanks for treating supply water, removing contaminants unsuitable for use in dialysis systems. The controller is operatively connected to a metering pump that supplies reducing agent to water supply 1 to remove oxidants from the supply water and scavenge oxygen, thereby reducing the chloride and chloramine levels of the supply water.

The controller is also operatively connected to a plurality of sensors for measuring the temperature, oxidation-reduction potential (ORP) and pH of the supply water at multiple points in the pre-treatment system. The controller can then adjust the amount of reducing agent injected into the water supply to accurately control the ORP/pH levels of the supply, thereby providing consistent, clean, de-chlorinated water to a final purification system for use in hemodialysis stations.

The invention is further capable of monitoring and adjusting the backwash, rinse and regeneration cycles of the plurality of filtration tanks required by the pre-treatment system and providing alarms when cycle durations or flow rates are outside of preset limits.

Other features, objects, and advantages of the invention will become readily apparent from the detailed description of the preferred embodiments taken in conjunction with the attached drawing Figures.

DETAILED DESCRIPTION OF THE PREFERRED EMBODIMENT(S)

Referring now to FIGS. 1A-3 and in accordance with one embodiment of the present invention, a control system 200 is provided for operating and monitoring a dialysis water pre-treatment system 10 that is used to produce de-chlorinated and softened water for a primary purification system 150, that in turn supplies purified water for use in a plurality of dialysis stations 190.

Figure 2:
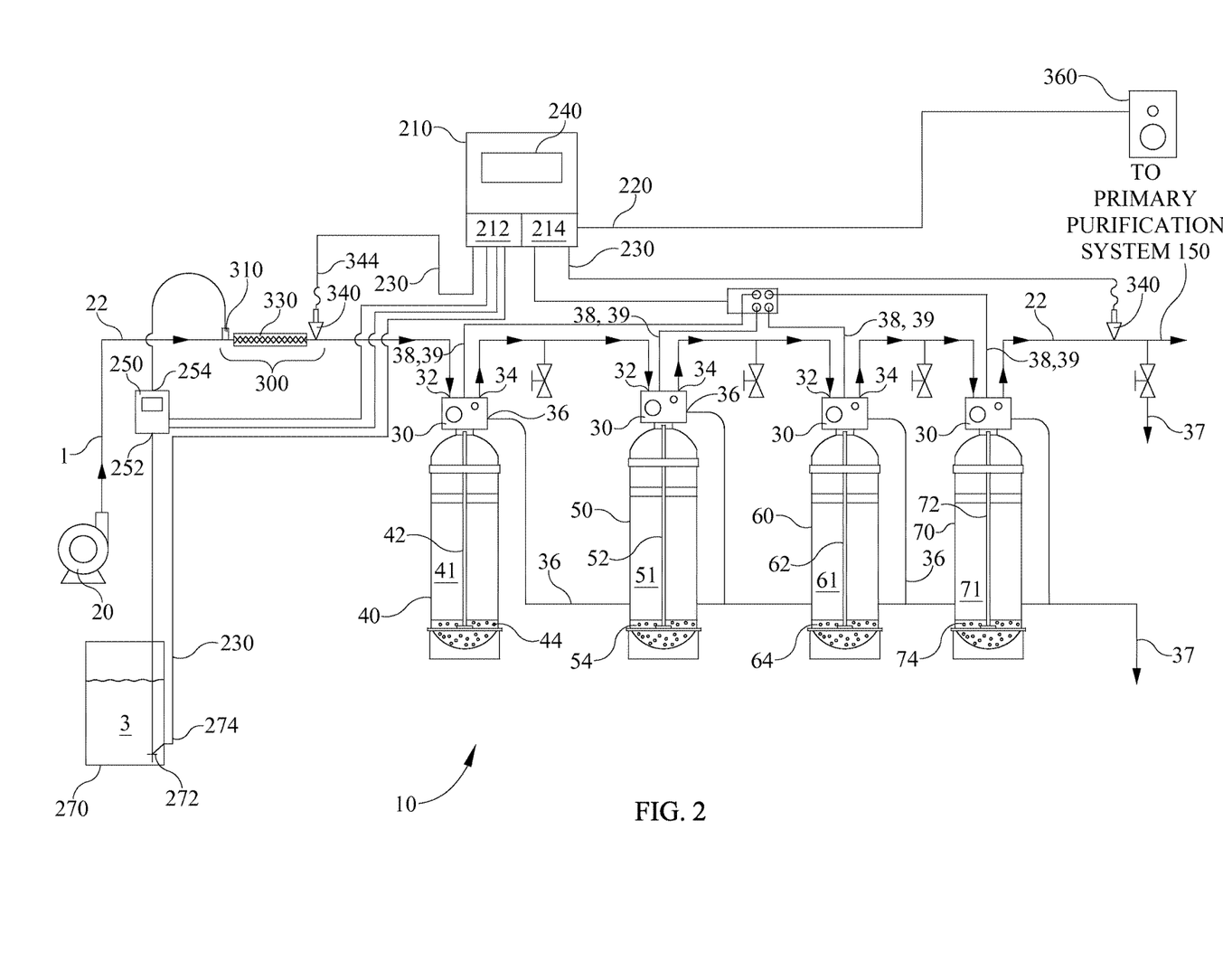
FIG. 2 is a schematic of a dialysis water purification system in accordance with one embodiment of the present invention.

Referring primarily to FIG. 2, an exemplary pre-treatment system 10 is depicted having a supply pump 20 for pressurizing and supplying a source of supply water 1 to system 10 through a supply line 22 and then through a plurality of media filtration and treatment tanks. Water 1 flows through supply line 22 into a series of filtration and/or softening tanks. Initially, supply line 22 is in fluid communication with a control valve 30 provided on a multi-media filtration tank 40, that is used as a first stage filter to remove contaminants from supply water 1. Filtration tank 40 comprises filtration media 41 disposed in tank 40, and a riser 42 that is in fluid communication with valve 30 and a tank bottom 44. Control valve 30 comprises an inlet 32 in fluid communication with supply line 22, and an outlet 34, as well as a drain outlet 36 that is in fluid communication with a system drain 37. Control valve 30 may be actuated to provide fluid communication between inlet 32 and riser 42, or outlet 34 and riser 42, as required in normal and backwash cycles of operation.

In normal operation, wherein filtration tank 40 is in use, control valve 30 connects inlet 32 to tank 40 such that supply water 1 travels downwardly through tank media 41, then upwardly through riser 42, which is in fluid communication with control valve outlet 34. In contradistinction, in a "backwash" mode of operation for cleaning filtration tank 40, control valve 30 prohibits flow through outlet 34 while connecting inlet 32 to riser 42, thereby forcing water to flow downwardly through riser 42, into tank bottom 44, and then upwardly through media 41 to dislodge and remove contaminants that then exit tank 40 through control valve outlet 36. It should be noted that during backwash operations pump 20 supplies a high volume of water 1 to provide a rapid upward flow through tank 40, thereby removing impurities and "fluffing" media, which then resettles as the backwash cycle terminates.

Control valves 30 may comprise conventional electrically actuated control valves that may be programmed via an integral timer (not shown) to perform normal and backwash modes of operation at predetermined intervals, independently of the operation of control system 200 of the present invention. In one embodiment of the invention, control system 200 may be configured to monitor the position of control valves 30 to determine proper cycle operation, as is disclosed below.

Pre-treatment system 10 may further comprise a first granulated activated carbon (GAC) filter 50, which is in fluid communication with outlet 34 of multi-media filter 40 via a control valve 30. GAC filter 50 comprises a carbon media 51, riser 52, and tank bottom 54, similar to the construction of tank 40. During normal operation, water 1 flows downwardly through media 51 into tank bottom 54, then upwardly through riser 52 and exits through valve 30 outlet 34.

Pre-treatment system may additionally include a first polisher GAC filter 60 which also uses activated carbon as a filtration medium, which is in fluid communication with outlet 34 of GAC filter 50 via a control valve 30. Polisher filter 60 comprises a carbon media 61, riser 62, and tank bottom 64, similar to the construction of GAC filter 50. During normal operation water 1 flows downwardly through media 61 into tank bottom 64, then upwardly through riser 52 and exits through control valve 30 outlet 34.

Finally, pre-treatment system 10 may include a water softener 70, which is in fluid communication with outlet 34 of polisher tank 60 via another control valve 30. Softener 70 comprises a riser 72 and a tank bottom 74, and is typically supplied with a source of brine 76, (shown only on FIG. 2) for removing hard deposits such as calcium and magnesium from supply water 1 via the known process of ion exchange. De-chlorinated, softened water 2 exits softener 70 through control valve 30 outlet 34 and is routed to primary purification system 150 through pre-treatment system outlet 80.

It should be noted that worker GAC 50 and polisher GAC 60 may both be operated in a normal and backwash mode of operation, identical to that described with respect to multi-media filter 40 herein above. Furthermore, softener 70 may be operated in a normal mode as well as a regeneration mode, which is directly analogous to backwash operation of filters 40, 50 and 60.

Figure 1A:
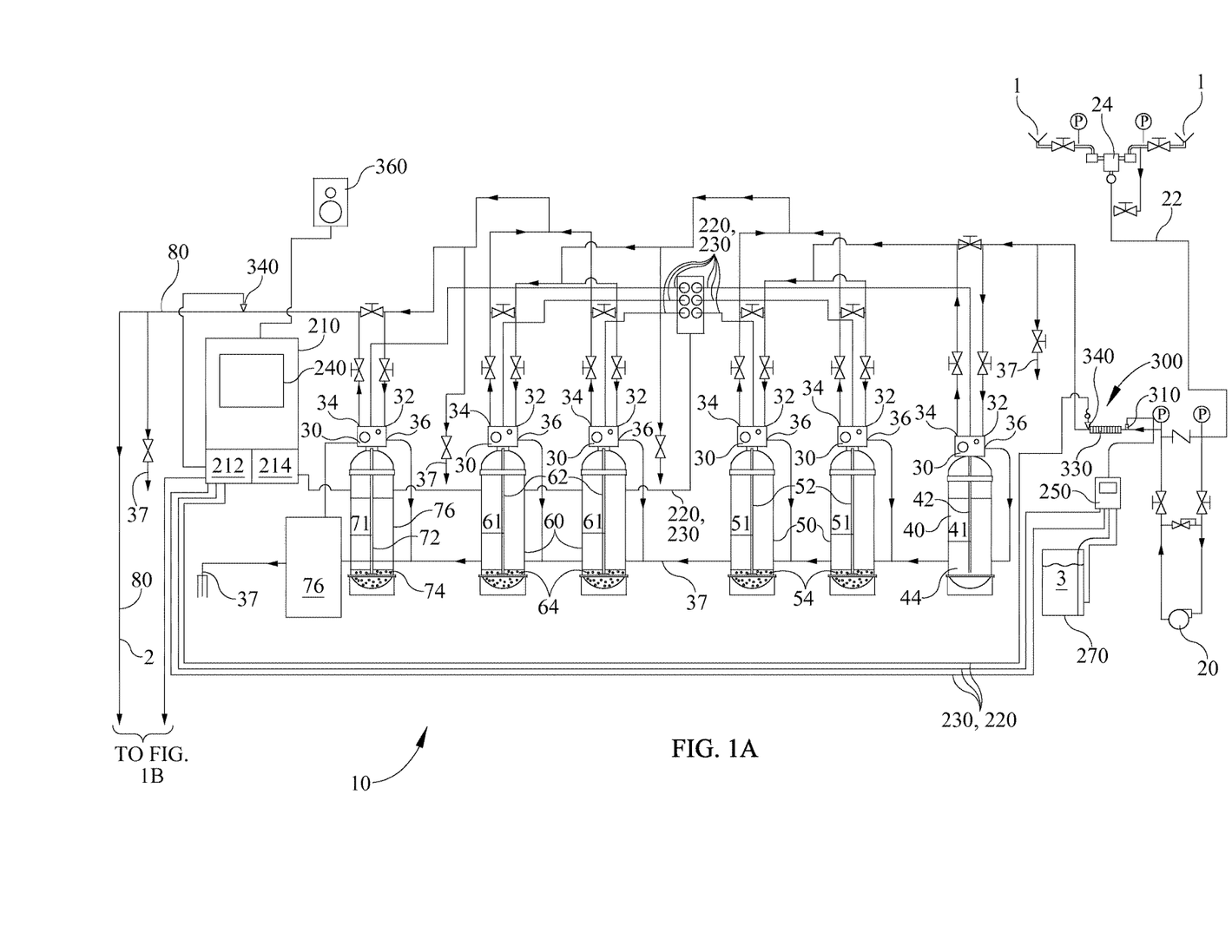
FIG. 1A is a schematic of a dialysis water purification system in accordance with one embodiment of the present invention.

Referring now to FIG. 1A, a similar though more elaborate pre-treatment system 10 is shown, having essentially the same components as that shown in FIG. 2 except that there are two stages each of GAC filter 50 and polisher filter 60. Supply water 1 may enter system 10 through both hot and cold water supplies, and be mixed by utilizing a blending valve 24 to provide proper temperature supply water 1.

Figure 1B:
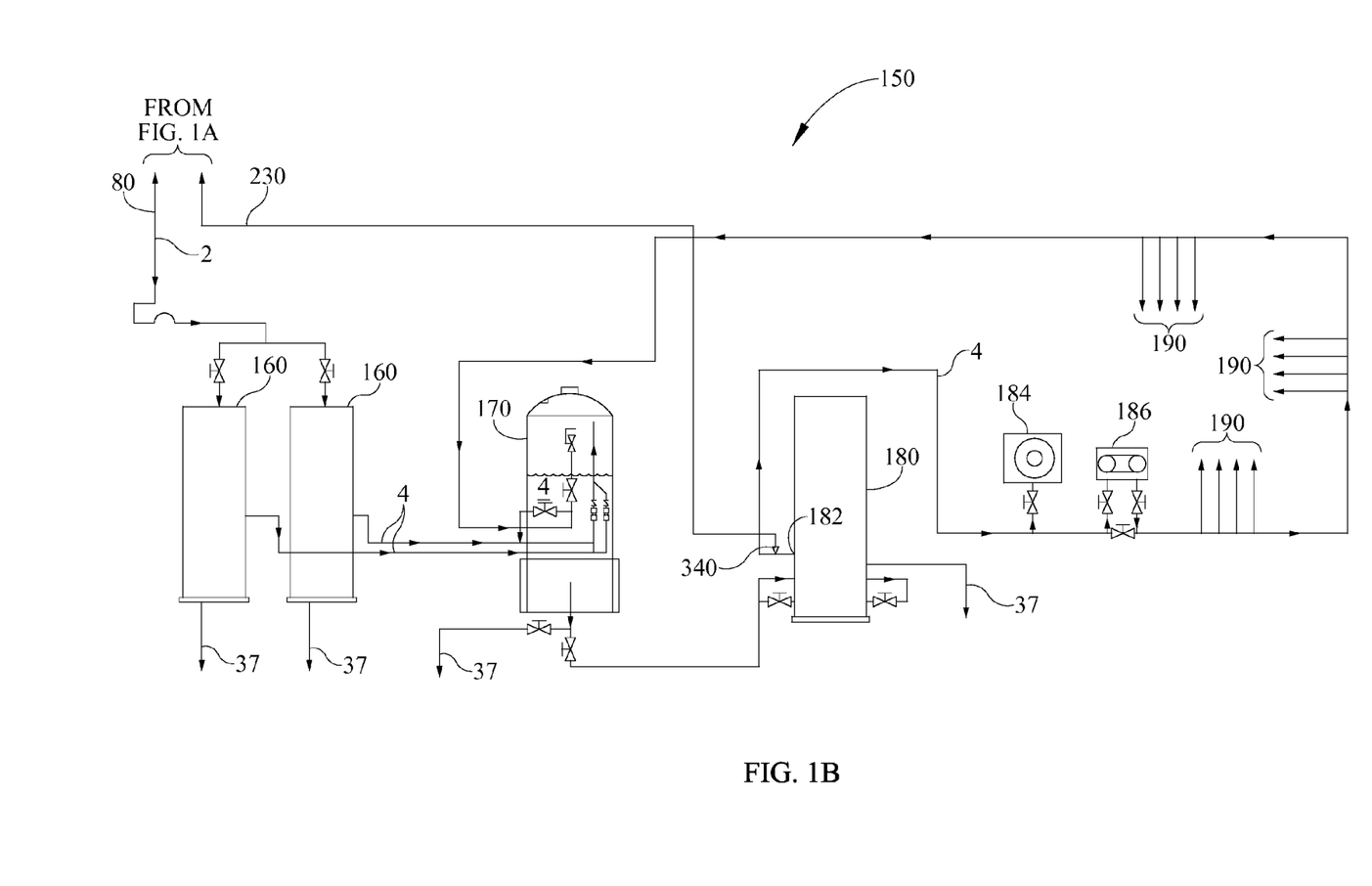
FIG. 1B is a schematic of a dialysis water purification system in accordance with one embodiment of the present invention.

Pre-treatment system 10 outlet 80 supplies softened, de-chlorinated water to a primary dialysis water purification system 150 that includes, but is not limited to, a plurality of reverse osmosis filtration units 160 for removing further solutes from de-chlorinated water 2, as is known in the art. Purified water 4 flows form reverse osmosis units 160 into a storage tank 170, that has an outlet 172 supplying purified water 4 to a final filtration unit 180. Final filtration unit 180 provides purified water 4 through an outlet 182 sequentially to a granulizer, 184, bi-carbonate mixer 186, and then to individual dialysis stations 190 for use in hemodialysis, as discussed herein above.

Referring again to FIGS. 1 and 2, and in accordance with one embodiment of the present invention, control system 200 for operating and monitoring a dialysis water pre-treatment system 10 comprises a controller 210, having a microprocessor 212 for executing programmed instructions, and a concomitant memory 214 for storing both data and controller operating system software. Controller 210 further includes a plurality of outputs 220 for supplying command signals to system 200 devices, as will be discussed in greater detail below. Outputs 220 may comprise discrete output signals of a predetermined voltage, analog signals of varying voltage or current, or data command signals without departing from the scope of the invention.

Controller 210 additionally comprises a plurality of inputs 230 for accepting electrical signals from system 200 devices. Inputs 230 may comprise discrete inputs that accept signals of predetermined voltages, analog inputs that accept signals of varying voltage or current, or data signals.

Control system 200 may additionally include an operator interface 240 (sometimes termed a human-machine interface, HMI) which may, in an exemplary embodiment, comprise a touch screen display that is integral to or separate from controller 210 that permits an operator to access controller 210 programming and configure various system 200 parameters. Throughout the specification operator actions relating to controller 210 may be assumed to be performed through operation of operator interface 240.

Control system 200 further comprises a metering pump 250, for example a digital metering pump that accepts an output 220 from controller 210 representative of flow rate of fluid to be supplied by pump 250. In an exemplary embodiment pump 250 comprises a digital metering pump utilizing a stepper motor capable of varying both pump speed and stroke responsive to an output 220 from controller 210 to supply the requested flow rate. Metering pump has an inlet 252 that is in fluid communication with a supply of a liquid reducing agent 3 stored in a tank or drum 270. Additionally, metering pump 250 includes a pump outlet for supplying metered reducing agent 3 to pre-treatment system 10, as discussed further herein below. Reducing agent 3 drum 270 may include a level switch 272 having an output 274 operatively connected to an input 230 of controller 210 for detecting and displaying on operator interface 240 a low level alarm for reducing agent 3.

Reducing agent 3 may be one of a variety of commercially available solutions for removing oxygen from a system. In one exemplary embodiment of the invention an aqueous solution of sodium bisulfate such as Reducite™ solution is utilized as a reducing agent 3 although a wide variety of reducing agents may be employed without departing from the scope of the present invention. Reducing agent 3 scavenges oxygen and related oxidizing agents present in supply water 1 thereby creating a pre-treatment system 10 that is hostile to microbial growth. Reducing agent 3 reacts with chlorine, forming sodium bisulfate and hydrochloric acid, and reacts with chloramines also producing ammonia. These three reaction byproducts are readily filtered by primary purification system 150 reverse osmosis filters 160, thereby eliminating these contaminants from water 1.

Figure 3:
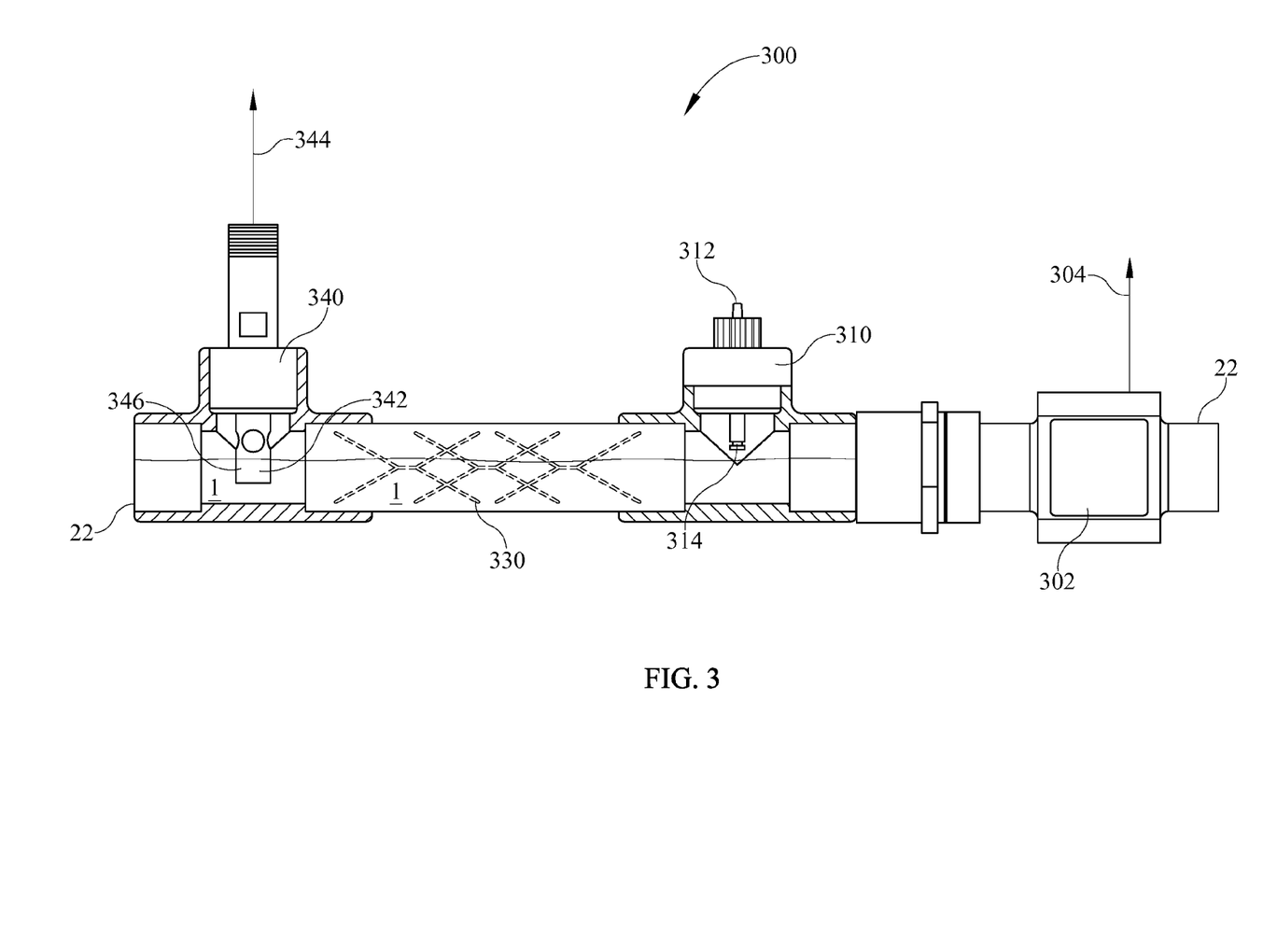
FIG. 3 is an elevation view of sensor assembly in accordance with one embodiment of the present invention.

Referring now to FIG. 3 control system 200 further includes an injection monitoring assembly 300 comprising an injector 310, a static mixer 330, an ORP/pH sensor 340, and a flow sensor 350. Injection monitoring assembly 300 is disposed in fluid communication with supply water line 22 upstream of multi-media filter 40 so that supply water 1 flows through injection monitoring assembly 300. Farthest upstream in assembly 300 is a flow sensor 302, shown in FIG. 3 as a turbine flow sensor through which supply water 1 passes, having an output signal 304 that is representative of supply water 1 flow rate, operatively connected to a to an input 230 of controller 210. Flow sensor 302 allows controller 210 to monitor and record supply water 1 flow rates through supply line 22 both for a variety of differing purposes set forth below.

Downstream from flow sensor 302 is disposed injector 310, which includes an inlet 312 in fluid communication with outlet 254 of pump 240 and an outlet 314 in fluid communication with water supply line 22 for injecting reducing agent 3 into supply water 1, and thereby reducing the oxidizing potential thereof. Pump 240 supplies a metered flow of reducing agent 3 to injector 310 for mixing with supply water 1, to reduce or change the oxidation-reduction potential and pH of supply water 1 as required for dialysis water applications.

Injection assembly 310 comprises a static mixer 330 disposed directly downstream from injector 310 through which water 1 and reducing agent 3 flow and are mixed by the interior surfaces of static mixer 330. Directly downstream and in fluid communication with static mixer 330 and supply line 22 is ORP/pH sensor 340 for monitoring the oxidation-reduction potential (ORP) and pH of water 1 after it is mixed with reducing agent 3. ORP/pH sensor 340 comprises a sensor head 342 that is in fluid communication with water 1 and reducing agent 3 mixture as it passes sensor head 342. Sensor 340 further comprises an output 344 that is representative of both the oxidation-reduction potential (ORP) of water 1 and the pH of water 1. Sensor 340 output 344 may comprise a digital data output 344 for proper representation of both ORP and pH that is operatively connected to an input 230 of controller 210 so that controller 210 can monitor both the ORP and pH of supply water 1 as it flows past sensor 340. This ORP/pH monitoring provides a feedback variable for controller 210 to use to control the flow rate of reducing agent 3 supplied by metering pump 350 through injector 310, whereby controller 210 may supply a greater flow of reducing agent 3 when the ORP/pH level of supply water 1 is too low, or reduce the flow of reducing agent 3 when the ORP/pH level of supply water 1 is too high.

Furthermore, sensor 340 head 342 may further comprise a temperature sensitive element 346, for example a thermocouple or RTD that provides an additional signal on output 344 representative of supply water 1 temperature, which can then be utilized in controller 210 to correct ORP and pH readings, since both the oxidation-reduction potential and pH of water are temperature dependent. By providing a sensor 340 that corrects for water supply 1 temperature, controller 210 can more accurately calculate the flow rate of reducing agent 3 required to produce a predetermined ORP/pH level in water supply 1.

Referring again to FIGS. 1A, 1B and 2 a second ORP/pH sensor 340 may also be employed for use with control system 200. FIG. 1A depicts second ORP sensor 340 disposed in pre-treatment outlet line 80, to monitor the ORP/pH of de-chlorinated water 2 being supplied to primary purification system 150. FIG. 1B depicts a third ORP sensor disposed in outlet line 182 of final filtration unit 180 to monitor the ORP/pH of purified water 4 being supplied to dialysis stations 190. Where the ORP/pH detected by second sensor 340 in either embodiment of the invention is outside of a predetermined acceptable range, controller 210 will provide an output 220 to an alarm 360 so that water 4 flow can be stopped immediately to prevent any harm to patients.

As discussed above, control valves 30 may comprise conventional electrically actuated control valves that may be programmed via an integral timer (not shown) to perform normal and backwash modes of operation at predetermined intervals, independently of the operation of control system 200 of the present invention. Additionally, control valves 30 may also comprise an output 38 that provides a signal representative of the position of control valves 30 to an input 230 of controller 210, such that controller 210 has positive feedback from control valve 30 for a given media tank 40, 50, 60, 70 that indicates whether the tank is in "normal" or "backwash" modes of operation. Output 38 may be provided from, for example, a micro-switch located inside valves 30 that is indicative of valve 30 position.

Furthermore, control valves 30 may also be equipped with an actuating input 39 that accepts an output 220 from controller 210 to initiate a backwash/regeneration cycle, moving control valve 30 into the proper position required to initiate a backwash cycle. In this embodiment of the invention, controller 210 may be programmed via operator interface 240 to initiate backwash or regeneration cycles for filtration systems 40, 50, 60 and 70 at specific times during the day or week where an operator knows that dialysis stations 190 will not be in use. As one example, an operator may program multi-media tank 40 for backwash and fast rinse beginning at 2 am each day, and further indicate that the backwash portion of the cycle will take place for a set time period or duration Tbackwash, and the fast rinse will take place for a set time period, Tfastrinse.

When the pre-programmed backwash time arrives for tank 40, controller 210 sends an output 220 to control valve 30 of tank 40, commanding control valve 30 to position itself for backwash operation whereby entering supply water 1 flows down through riser 42 and thence upwardly through filter media and out to drain 36.

During this backwash mode of operation, controller 210 saves in data memory 214 the flow rate of water 1 entering tank 40 (in, for example gallons/min) and the time that tank 40 remains in backwash mode. Controller 210 monitors flow sensor 302 output 304 to determine the rate of supply water flow 1 to pre-treatment system 10 which is equivalent to the backwash cycle flow rate, since tanks 40, 50, 60 and 70 ideally do not enter backwash cycles simultaneously. Controller 210 may similarly track the flow rate and duration of backwash flow for each tank in pre-treatment system 10. This data can be displayed on operator interface 240 during a backwash operation and is also saved after each backwash cycle is completed so that an operator can verify that the backwash cycle of a specific tank has been completed. In this fashion, controller 210 can be pre-programmed to backwash each pre-treatment system 10 tank sequentially. Since no two tanks 40, 50, 60 and 70 should be backwashed simultaneously, controller 210 will prohibit the programming of two backwash cycles that have overlapping time periods, by prohibiting the actuation of any two control valves 30 into backwash cycles at the same time. This feature of the instant invention assures an operator that each backwash cycle is complete before another begins.

Where controller 210 records backwash cycle data that is below a predetermined set point for either backwash cycle duration or supply water 1 flow rate, controller 210 will provide an output 220 that may be supplied to activate a remote alarm 360, as well as provide a visual indication of an incomplete backwash cycle that is displayed as an alarm on operator interface 240. In other words, controller 210 monitors each tank 40, 50, 60, 70 backwash cycle to assure that sufficient backwash time and flow rate have been accomplished to assure the purity of de-chlorinated water being supplied to primary purification system 150.

When control system 200 is integrated into existing pre-treatment 10 systems, where control valves 30 each include integral timers that are programmed individually to enter backwash cycles at predetermined times, controller 210 may still be programmed with the predetermined backwash cycle times of each tank 40, 50, 60, 70 and monitor both the duration of the backwash cycle as determined by control valve 30 output 38 and the flow rate of the backwash cycle as determined by flow sensor 302. Again, controller 210 provides an alarm either via output 220 to a remote alarm 360 or via operator interface 240 when a backwash cycle is of insufficient duration or flow rate.

Furthermore, it should be understood that each filtration tank 40, 50, 60, 70 may also be required to undergo a fast rinse cycle after a backwashing cycle occurs. Controller 210 may also be programmed to monitor both the duration and flow rates of each fast rinse cycle as well as record the values of these variables upon cycle completion, identical to the operation disclosed with respect to the backwash cycles disclosed herein above. Suitable alarms may be provided if fast rinse duration and flow rates are not within predetermined acceptable limits, as set by an operator via operator interface 240.

During pre-treatment system 10 normal operation, wherein supply water 1 is being pre-treated for use in primary purification system 150, control system 200 performs constant monitoring and adjustment of supply water 1 ORP and pH. In one embodiment of the invention, control system 200 operator interface 240 provides a display that depicts ORP and pH readings (in millivolts and pH units respectively) for each sensor 340 present in system 10. Furthermore, operator interface 240 includes a display on operator interface 240 accessible to an operator that shows metering pump 250 flow rate settings and the amount of reducing agent 3 injected through injector 310 by pump 250. These variables may be displayed simultaneously as flow rates per min, per hour, and total flow volume for a larger time period, for example a 24 hour period.

System 200 is also capable of being operated in a disinfect mode of operation, wherein a primary purification system disinfection cycle is initiated. A "Loop Disinfection" display gives an operator the ability to monitor the disinfection cycle. During the disinfection cycle controller 210 permits pump 20 to continue running to operate the pre-treatment system 10, even though ORP/pH sensor located at final filtration tank 180 will sense ORP and pH levels that are out of range for use during dialysis. The disinfection of primary purification system (or purified water "loop") 150 is accomplished either manually or by a separate control system (not shown) wherein a disinfectant such as sodium hypochlorite with a pH of no greater than 7.5 is supplied to primary purification system at a concentration of not less than 500 ppm. In this example of loop disinfection the ORP and pH levels required to accomplish disinfection are ORP>890 and pH<7.5. Accordingly, controller 210 will monitor sensor 340 disposed in primary purification system until it detects ORP and pH at acceptable levels, whereupon controller 210 begins a countdown timer for a predetermined time period, for example a 30 minute dwell time. The dwell timer will continue as long as the ORP and pH remain at acceptable levels. If they do not, the timer will stop, and an alarm will be displayed for the operator indicating improper loop disinfection. Additionally, the ORP and pH setpoints, as well as the dwell time may be programmed by an operator using interface 240, to meet the demands of different systems.

The control system 200 of the present invention further provides an operator with a plurality of alarms to indicate potential problems requiring alarm indications with pre-treatment system 10 that must be addressed. Typically, alarms are displayed via an indicator of a suitable color such as red on operator interface 240, and the time the alarm occurred is recorded in a data log saved in memory 214. Critical alarms may trigger remote alarm 360 to provide an audible alarm indication as well as a visual indication. In addition to alarms for incomplete backwash and regeneration cycles and inadequate backwash, rinse, and regeneration flow rates as discussed above, control system 210 may provide the following alarms; Low supply water 1 pH level, loop disinfection incomplete, reducing agent tank 270 level low, metering pump 250 flow (is excessive without change) and loop ORP/pH out of range. The last alarm will require controller 210 to shut down pumps 20, since this condition may harm dialysis patients. Typically, controller 210 will provide an alarm output 220 to controller (not shown) or prrogrammable logic controller or the equivalent, that is used to operate the primary purification system 150. This alarm output 220 is indicative of a critical fault with pre-treatment water 2, requiring that controller to shut down primary purification system pumps to avoid potential injury to patients.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A control system for operating a pre-treatment system for a water primary purification system to provide water for dialysis, said pre-treatment system having a supply water pump for circulating untreated supply water through a supply water line to said pre-treatment system having at least one filtration tank for removing contaminants from said supply water, wherein said at least one filtration tank comprises a control valve for operating said tank in filtration and backwash modes and a pre-treatment system water outlet, said control system comprising:
   a controller having a microprocessor and concomitant data memory, said controller further having a plurality of outputs for supplying electrical operating signals and a plurality of inputs for accepting electrical signals of system parameters;
   a metering pump having an inlet connected to a source of reducing agent and an outlet; and
   an injection monitoring assembly disposed in said supply water line upstream of said at least one filtration tank comprising:
      an injector having a valve in fluid communication with the outlet of said metering pump and with said supply water line for supplying a volume of reducing agent to said supply water;
      a static mixer disposed in said supply water line downstream of said injector for mixing said supply water and said reducing agent as said water and reducing agent flow through said static mixer; and
      an Oxidation Reduction Potential and pH (ORP/pH) sensor in fluid communication with said supply line disposed downstream of said static mixer for determining the ORP and pH of said supply water and reducing agent after they exit said static mixer;
   a flow sensor in fluid communication with said supply water line upstream of said injection assembly having an output of supply water flow rate operatively connected to a first input of said controller;
   a first output of said controller operatively connected to said control valve to actuate said control valve thereby initiating a backwash sequence of said at least one filtration tank, whereby said control valve remains actuated to control the duration of said backwash sequence for a predetermined water flow rate; and
   a second output of said controller operatively connected to said control valve to actuate said control valve for a predetermined time period and a predetermined flow rate, thereby initiating a rinse sequence of said at least one filtration tank.

2. A control system as claimed in claim 1 further comprising:
   said ORP/pH sensor having output representative of ORP/pH operatively connected to an input of said controller for monitoring the ORP/pH level of said supply water as measured at said ORP/pH sensor; and
   an output of said controller operatively connected to said metering pump for varying the volume of said reducing agent based upon said ORP/pH level of said supply water.

3. A control system as claimed in claim 1 comprising:
   a second ORP/pH sensor having output representative of ORP/pH operatively connected to an input of said controller, said second ORP/pH sensor disposed downstream of said at least one filtration tank and in fluid communication with said pre-treatment system water outlet for monitoring the ORP/pH level of the water as measured at said second ORP/pH sensor.

4. A control system as claimed in claim 1 further comprising:
   a controller input operatively connected to an output of said control valve of said at least one filtration tank for providing an indication to said controller of said control valve position, whereby said controller can determine whether said at least one filtration tank is in a filtration or backwash operating mode.

5. A control system as claimed in claim 1 comprising:
   an input to said controller operatively connected to said at least one filtration tank control valve to determine whether said at least one filtration tank is in normal or backwash mode; and
   an output of said controller representative of an alarm condition, said output provided by said controller when said control valve is in backwash mode, and when said control valve does not remain in backwash mode for a pre-determined time period and providing said alarm condition output when the flow rate of said supply water as measured by said flow sensor is below a pre-determined average flow rate.

6. A control system for a supply water pre-treatment system for providing de-chlorinated water to a primary purification system, said pre-treatment system comprising a supply water line in fluid communication with a plurality of filtration tanks, each of said tanks having a control valve for placing said tanks in normal or backwash cycles, each of said control valves having an actuation input for actuating said valve, and each of said control valves having an output representative of control valve position, said control system comprising:
   a controller having a microprocessor and concomitant data memory and having a plurality of outputs for supplying electrical operating signals and a plurality of inputs for accepting electrical signals of system parameters;
   a metering pump having an inlet connected to a source of reducing agent and an outlet; and
   an injection monitoring assembly disposed in said supply water line upstream of said plurality of filtration tanks comprising:
      an injector having a valve in fluid communication with the outlet of said metering pump and with said supply water line for supplying a volume of reducing agent to said supply water;
      a static mixer disposed in said supply water line downstream of said injector for mixing said supply water and said reducing agent as said water and media flow through said static mixer;
      an ORP/pH sensor in fluid communication with said supply water line disposed downstream of said static mixer for determining the ORP and pH of said supply water, said ORP/pH sensor having an ORP and pH output signal;
   a flow sensor disposed in said supply water line upstream of said injector having an output signal of the water flow rate through said supply water line operatively connected to an input of said controller;
   a plurality of outputs of said controller operatively connected to said actuation inputs of said control valves for placing said valves in a backwash or normal operational cycle;
   a plurality of inputs of said controller operatively connected to a plurality of control valve position outputs;

wherein said controller provides an output to a one of said control valves to place a one of said tanks in a backwash cycle; and wherein said controller monitors said backwash cycle of said one tank by verifying that said control valve is in backwash cycle for a pre-determined duration, and that the flow rate of said supply water as measured by said flow sensor is above a predetermined average rate and providing an alarm condition output when the flow rate of said supply water as measured by said flow sensor is below a pre-determined average flow rate.

7. A control system as claimed in claim 6 wherein said OPR/pH sensor comprises:

a temperature sensor having a supply water temperature output, wherein said ORP/pH sensor output and said temperature sensor output are operatively connected to an input of said controller.

8. A method for controlling a supply water pre-treatment system for providing de-chlorinated water to a primary purification system, said pre-treatment system comprising a supply water line in fluid communication with a plurality of filtration tanks, each of said tanks having a control valve for placing said tanks in normal or backwash cycles, each of said control valves having an actuation input for actuating said valve, and each of said control valves having a control valve position output, said method comprising:

providing a controller having a microprocessor and concomitant data memory and having a plurality of outputs for supplying electrical operating signals and a plurality of inputs for accepting electrical signals of system parameters;

providing a metering pump having an inlet connected to a source of reducing agent and an outlet; and providing an injection monitoring assembly disposed in said supply water line comprising:

providing an injector having a valve in fluid communication with the outlet of said metering pump and with said supply water line upstream of said filtration tanks, for supplying a volume of reducing agent to said supply water;

providing a static mixer disposed in said supply water line for mixing said supply water and said oxidizing media as said water and media flow through said static mixer;

providing an ORP/pH sensor in fluid communication with said supply water line disposed downstream of said static mixer for determining the ORP and pH of said supply water, said ORP/pH sensor having an output of ORP and pH;

providing a flow sensor disposed in said supply water line upstream of said injector having an output operatively connected to an input of said controller representative of the water flow rate through said supply water line; and monitoring said plurality of filtration tanks when said control valves are in backwash cycles to determine the time period said control valves have been in backwash position;

monitoring said supply water flow rate during said backwash cycle;

providing an alarm indicative of inadequate backwash flow rate if said supply water flow rate is not greater than a pre-determined average; and providing an alarm of inadequate backwash duration if the time period said control valves are in backwash position is below a predetermined minimum.

9. A method for controlling a supply water pre-treatment system as claimed in claim 8 comprising:

monitoring said supply water ORP and pH levels as provided by said ORP/pH sensor; and adjusting said ORP ad pH levels of said supply water by adjusting a flow rate of said reducing agent as provided by said metering pump.

10. A method for controlling a supply water pre-treatment system as claimed in claim 8 comprising:

providing an operator interface whereby and operator may provide said controller a pre-determined average flow rate for said backwash cycles and a duration of said backwash cycles.

* * * * *